United States Patent
Faucher et al.

(10) Patent No.: US 8,091,143 B2
(45) Date of Patent: Jan. 3, 2012

(54) ATOMIC FORCE MICROSCOPY PROBE

(75) Inventors: Marc Faucher, Lille (FR); Lionel Buchaillot, Marcq en Baroeul (FR); Jean-Pierre Aime, Bordeaux (FR); Bernard Louis Amand Legrand, Lille (FR); Gerard Couturier, Gradignan (FR)

(73) Assignees: Centre National de la Recherche Scientifique, Paris (FR); Universite de Bordeaux 1, Talence (FR)

( * ) Notice: Subject to any disclaimer, the term of this patent is extended or adjusted under 35 U.S.C. 154(b) by 29 days.

(21) Appl. No.: 12/598,490

(22) PCT Filed: Apr. 23, 2008

(86) PCT No.: PCT/FR2008/000580
§ 371 (c)(1),
(2), (4) Date: Mar. 30, 2010

(87) PCT Pub. No.: WO2008/148951
PCT Pub. Date: Dec. 11, 2008

(65) Prior Publication Data
US 2010/0205698 A1    Aug. 12, 2010

(30) Foreign Application Priority Data
May 2, 2007   (FR) .................................. 07 03161

(51) Int. Cl.
*G01N 13/16* (2006.01)
*H01L 29/84* (2006.01)
*H03H 9/00* (2006.01)

(52) U.S. Cl. .................. 850/1; 850/21; 850/40; 73/105

(58) Field of Classification Search ................ 850/1, 21, 850/40; 73/105
See application file for complete search history.

(56) References Cited

U.S. PATENT DOCUMENTS

| | | | |
|---|---|---|---|
| 4,851,671 A | 7/1989 | Pohl | |
| 6,611,178 B1 * | 8/2003 | Kawakatsu et al. | 331/154 |
| 7,555,940 B2 * | 7/2009 | Su et al. | 73/105 |
| 7,726,189 B2 * | 6/2010 | Vyas et al. | 73/580 |
| 2006/0243036 A1 | 11/2006 | Lee et al. | |
| 2007/0046397 A1 * | 3/2007 | Bajaj et al. | 333/186 |
| 2007/0089496 A1 | 4/2007 | Degertekin | |

FOREIGN PATENT DOCUMENTS

| | | |
|---|---|---|
| EP | 0 290 647 | 11/1988 |
| EP | 1 203 749 | 5/2002 |

OTHER PUBLICATIONS

Maali, Abdelhamid et al., "Hydrodynamics of oscillating atomic force microscopy cantilevers in viscous fluids", Journal of Applied Physics, American Institute of Physics, vol. 97, No. 7, pp. 074907-1-074907-6 (Mar. 29, 2005) XP012071015.

* cited by examiner

*Primary Examiner* — Nikita Wells
(74) *Attorney, Agent, or Firm* — Oblon, Spivak, McClelland, Maier & Neustadt, L.L.P.

(57) ABSTRACT

A probe for atomic force microscopy (SM) comprising a micromechanical resonator (RMM) and a tip for atomic force microscopy (P1) projecting from said resonator, the probe being characterized in that: it also includes means (EL1) for selectively exciting a volume mode of oscillation of said resonator (RMM); and in that said tip for atomic force microscopy (P1, P1') projects from said resonator substantially in correspondence with an antinode point (PV1) of said volume mode of oscillation. An atomic force microscope including such a probe (SM'). A method of atomic force microscopy including the use of such a probe.

26 Claims, 2 Drawing Sheets

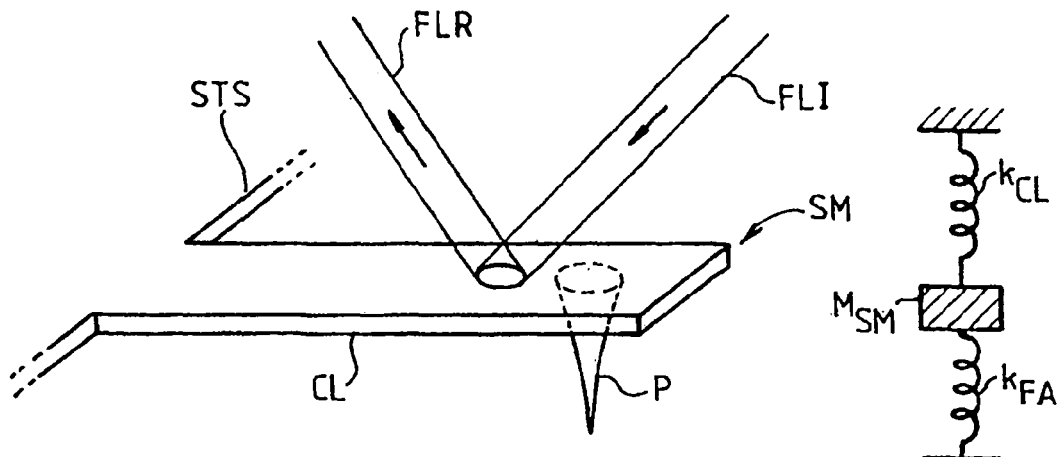
FIG.1A
PRIOR ART
FIG.1B
PRIOR ART
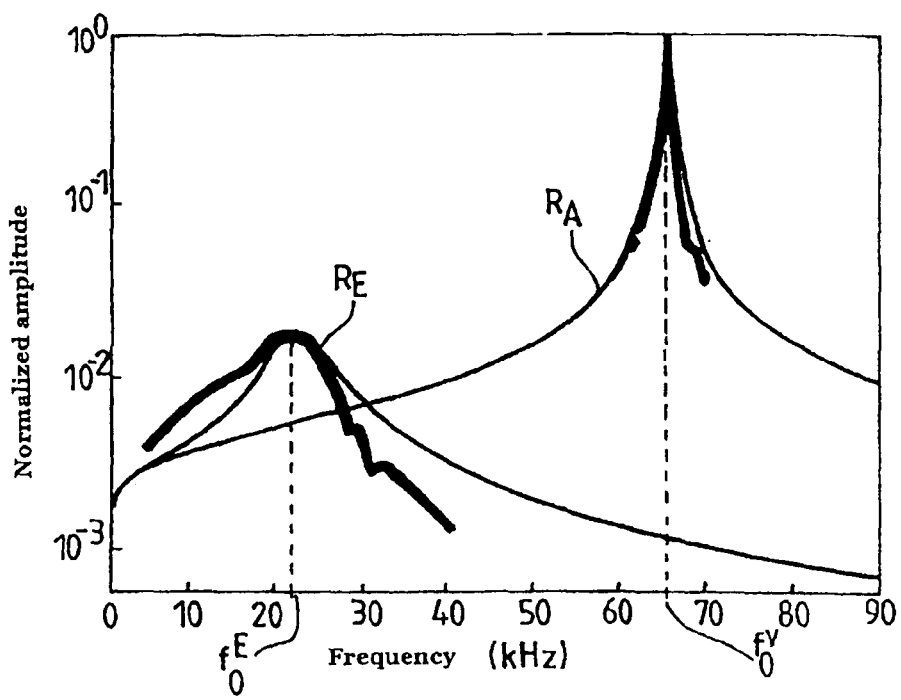
FIG.1C
PRIOR ART

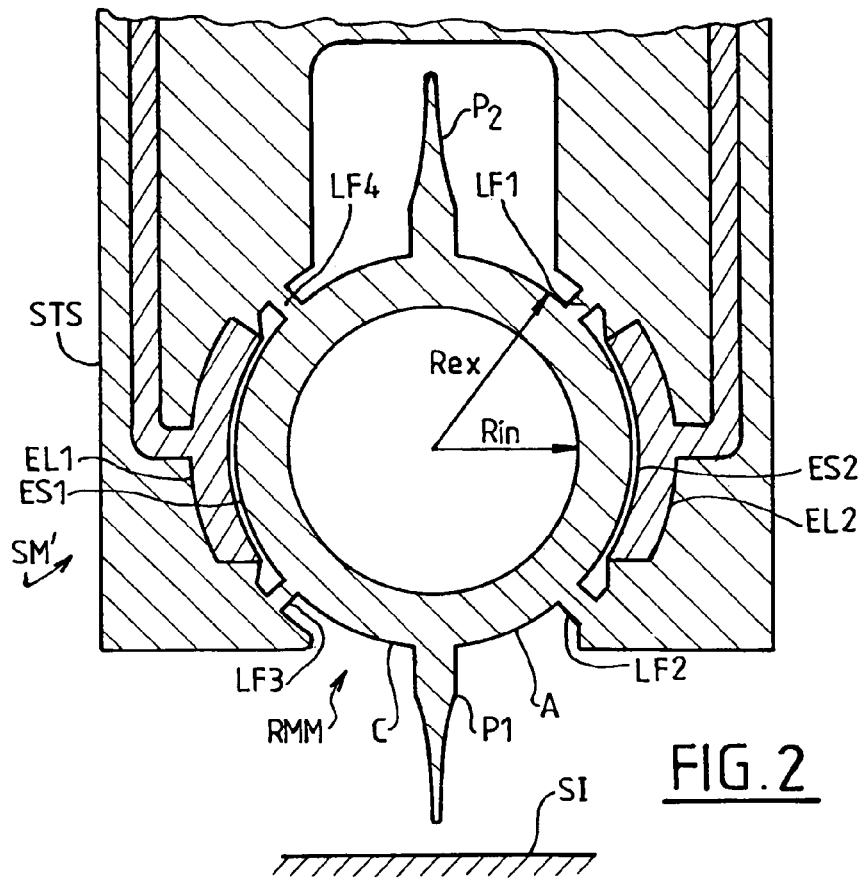
FIG.2
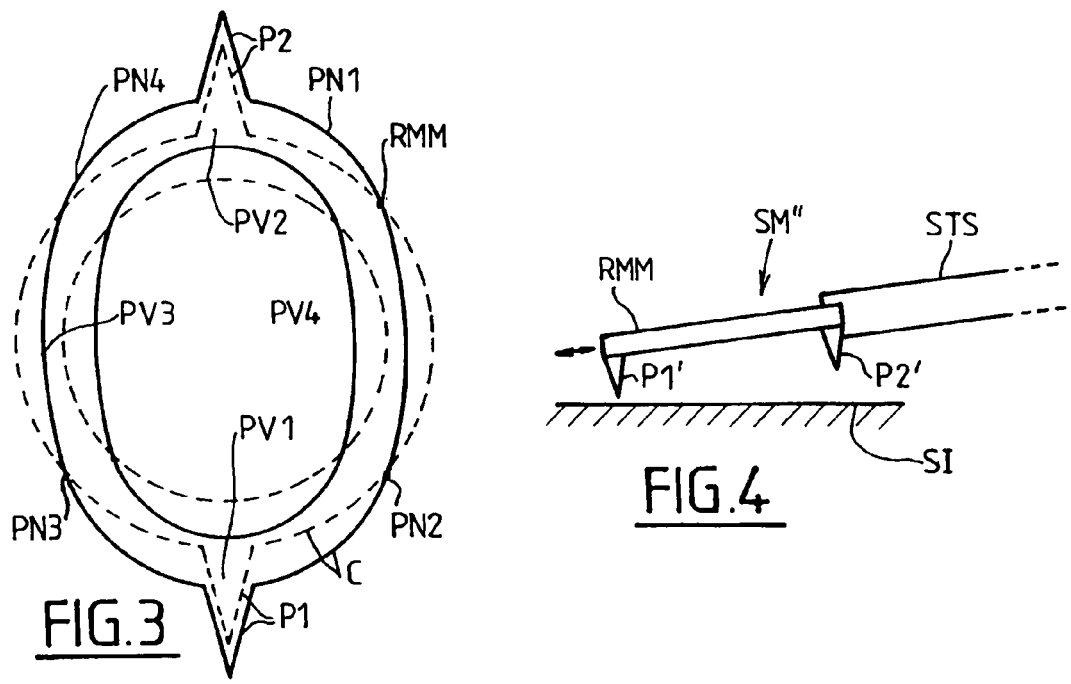
FIG.3
FIG.4

ATOMIC FORCE MICROSCOPY PROBE

The invention relates to a probe for atomic force microscopy, to an atomic force microscope including such a probe, and to a method of atomic force microscopy.

Atomic force microscopy (AFM) is a scanning microscopy technique that has been developed since the 1980s and that makes it possible to achieve resolution at the scale of an atom. Unlike tunnel effect scanning microscopy, atomic force microscopy is not limited to forming images of conductive surfaces, which means that it is particularly suitable for use with materials that are insulating, semiconductive, and also samples of a biological nature.

This technique finds an application in numerous fields of pure and applied research, and also in the microelectronics industry.

The essential component of a conventional atomic force microscope is a probe constituted by a cantilever, i.e. a lever that has one end fixed and that is provided at its opposite end with a tip that points towards the surface or object to be observed. The lever generally presents a length of the order of a few tens or hundreds of micrometers, and the tip presents a radius of curvature of a few tens or hundreds of nanometers. Such a probe, generally made of monocrystalline silicon or polycrystalline silicon, may be fabricated using conventional photolithographic techniques, at low cost.

When the tip of the probe approaches a surface, it is subjected to the influence of attractive or repulsive forces of chemical, van der Waals, electrostatic, and/or magnetic nature. By measuring these forces while the tip scans the surface of the object to be observed, it is possible to reconstitute an image thereof.

The forces acting between the tip and the object can be measured in various ways.

In the technique that is the simplest and the oldest (static AFM), observation applies solely to how the cantilever supporting the tip is deflected, in particular by using optical means.

Better sensitivity can be obtained by causing the lever to vibrate in one of its resonant modes, and by observing variations in resonant frequency induced by the gradients of such forces (dynamic AFM).

In practice, the dynamic technique is generally preferred for observations performed in a vacuum or air. This technique is less well suited to observations made in a liquid medium, since vibration of the lever is heavily damped therein.

A general introduction to the principle of atomic force microscopy is to be found in the article by F. J. Giessibl and C. F. Quate, "Exploring the nanoworld with atomic force microscopy", Physics Today, December 2006, pp. 44-50.

Nowadays, atomic force microscopy is an experimental technique of great power. Nevertheless, it remains desirable to improve its performance.

Firstly, it is desirable to improve its sensitivity, i.e. to enable forces to be measured of ever smaller values, and this applies equally to measurements taken in a vacuum, in air, or in a liquid medium.

It is also desirable to improve the time resolution of measurements, so as to enable images to be acquired in a very short time and so as to make it possible to observe dynamic phenomena in real time.

It is also desirable, for dynamic AFM, to enable means for exciting and for detecting vibration of the lever to be made integrally therewith.

The invention seeks to achieve at least some of the above objects.

In accordance with the invention, this is made possible by making use of a volume mode of oscillation of a micromechanical resonator, instead of a bending mode as in prior art probes.

The invention thus provides a probe for atomic force microscopy comprising a micromechanical resonator and a tip for atomic force microscopy projecting from said resonator, the probe being characterized in that: it also includes means for selectively exciting a volume mode of oscillation of said resonator; and in that said tip for atomic force microscopy (P1, P1') projects from said resonator substantially in correspondence with an antinode point (PV1) of said volume mode of oscillation.

In particular embodiments of the invention:

The probe may also include means for detecting the oscillations of said micromechanical resonator in said volume mode of oscillation.

Said means for detecting the oscillations of said micromechanical resonator may be selected from a capacitive sensor and a piezoelectric sensor.

Said means for selectively exciting a volume mode of oscillation of said resonator may be selected from a capacitive actuator and a piezoelectric actuator.

Said micromechanical resonator may present a planar structure, and said volume mode of oscillation is a planar mode of deformation of said resonator.

Said micromechanical resonator may present thickness lying in the range 0.01 micrometers (μm) to 10 μm, and preferably in the range 0.05 μm to 5 μm.

Said micromechanical resonator may be in the form of a disk or a ring. Under such circumstances, said volume mode of oscillation may be an elliptical mode.

When said micromechanical resonator is in the form of a disk, it may present an outside radius lying in the range 0.1 μm to 200 μm.

Said tip for atomic force microscopy may extend in the plane of said micromechanical resonator from the outline thereof.

In a variant, said tip for atomic force microscopy may form an angle with the plane of said micromechanical resonator.

Said volume mode of oscillation may present a resonant frequency in a vacuum lying in the range 10 megahertz (MHz) to 20 gigahertz (GHz), and preferably in the range 50 MHz to 2 GHz.

Said micromechanical resonator may present, for said volume mode of oscillation, a quality factor in a vacuum lying in the range $10^3$ to $10^5$, and preferably in the range $5 \times 10^3$ to $5 \times 10^4$.

Said micromechanical resonator may present, for said volume mode of oscillation, a quality factor in water lying in the range $10^2$ to $5 \times 10^4$, and preferably in the range $10^3$ to $10^4$.

Said volume mode of oscillation may present at least one node point on the outline of said micromechanical resonator, and the resonator may present fastener means for fastening it to a support structure positioned in correspondence with said node point. In particular, said probe may include single fastener means in the form of a beam.

Said micromechanical resonator may present a structure that is symmetrical, said probe presenting at least one balancing element having a moment of inertia substantially equal to that of the tip and disposed in such a manner as to preserve the symmetry of said structure.

At least said micromechanical resonator and said tip for atomic force microscopy may be made monolithically.

Advantageously, said micromechanical resonator, said tip for atomic force microscopy, said electrostatic sensor, and said electrostatic actuator may be made monolithically.

At least said micromechanical resonator and said tip for atomic force microscopy may be made of silicon.

Said micromechanical resonator may be disposed at the end of a beam constituting a support structure therefor.

The invention also provides an atomic force microscope including a probe according to any preceding claim.

The invention also provides a method of atomic force microscopy, the method comprising the steps consisting in:
  causing the tip for atomic force microscopy of a probe as described above to approach a surface for imaging;
  selectively exciting a volume mode of oscillation of the micromechanical resonator of said probe by using means provided for that purpose, said volume mode of oscillation presenting a resonant frequency; and
  detecting variations in the resonant frequency of said volume mode of oscillation as induced by forces acting between said surface for imaging and said tip for atomic force microscopy.

The invention also provides a method of atomic force microscopy, the method comprising the steps consisting in:
  causing the tip for atomic force microscopy of a probe as described above to approach a surface for imaging;
  selectively exciting a volume mode of oscillation of the micromechanical resonator of said probe by using means provided for that purpose, said volume mode of oscillation presenting a resonant frequency; and
  detecting the variations in the amplitude of said volume mode of oscillation as induced by forces acting between said surface for imaging and said tip for atomic force microscopy.

In particular, at least said surface for imaging and said tip for atomic force microscopy may be immersed in a liquid medium.

Other characteristics, details, and advantages of the invention appear on reading the description made with reference to the accompanying drawings given by way of example and showing, respectively:

FIG. 1A: a probe for atomic force microscopy of a type known in the prior art;

FIG. 1B: a diagram of a simplified mechanical model of the FIG. 1A probe;

FIG. 1C: the resonance peaks of the FIG. 1A probe in air and in water;

FIG. 2: an elevation view of a probe in a first embodiment of the invention;

FIG. 3: an elliptical vibration mode of the resonator of the FIG. 2 probe; and

FIG. 4: a side view of a probe in a second embodiment of the invention.

FIG. 1A shows the typical structure of a probe SM of the prior art for atomic force microscopy. Such a probe is essentially constituted by a fixed-end lever or "cantilever" CL that projects from a support structure STS. Close to the distal end of the lever CL (i.e. its end remote from the support structure STS), there is a tip that projects from a main surface of said lever towards a surface for imaging SI. A laser beam FLI is directed to the lever CL so as to be reflected thereby; any deflection of the lever gives rise to a deflection of the reflected beam FLR, which can be detected by a four-quadrant photodetector.

The lever CL is generally made of silicon using photolithographic methods and it presents a length lying in the range a few tens to a few hundreds of micrometers, a width similarly of a few tens of micrometers, and a thickness of a few micrometers.

The lever CL can vibrate in a bending mode that defines alternating motion for the tip P towards the surface SI. It can therefore be modeled by a mechanical oscillator of the mass-spring type, characterized by a "mass" $M_{SM}$ and by a spring constant (or stiffness) $k_{CL}$. The oscillation of the system is disturbed by the presence of forces that act between the tip P and the surface SI; this disturbance may be modeled by an additional spring that presents stiffness $k_{FA}$ that is given by the gradient of said forces. The effect of the disturbance is to modify the resonant frequency $f_0$ of the system which goes from:

$$\frac{\sqrt{k_{CL}/M_{SM}}}{2\pi} \text{ to } \sqrt{\frac{(k_{CL}/k_{FA})/M_{SM}}{2\pi}}$$

Measuring the frequency of vibration of the lever, which can be done by the optical method described with reference to FIG. 1, thus serves to determine $k_{FA}$ and therefore to provide information about the surface SI.

A more detailed study of that system makes it possible to show that its sensitivity to force gradients increases with increasing factor $f_0.Q/k_{CL}$ where Q is the quality factor of the oscillator. As a result, it is generally desirable to maximize the resonant frequency $f_0$ and the quality factor Q.

Specifically, prior art probes present resonant frequencies that may be as high as 300 kilohertz (kHz) and quality factors in air that may be as high as 500, thereby leading to sensitivity of the order of 100 piconewtons (pN). Beyond that, limits are encountered that are intrinsic to the system.

In order to increase the resonant frequency, it is necessary to reduce the length of the lever CL. However that makes the probe difficult to fabricate, in particular concerning the positioning of the tip P, and also concerning the excitation and the detection of its oscillations. Furthermore, it is difficult to reduce the dimensions of the lever since that would require electron lithographic techniques to be used, thereby increasing cost.

Furthermore, it would be desirable to increase the quality factor Q. It is known that this parameter is limited by the energy losses that occur inevitably over the entire width of the lever where the lever is connected to the structure of the support.

The performance of the FIG. 1A probe is significantly degraded when it is immersed in a liquid, such as water or an organic solvent, as is often necessary to enable a biological structure to be observed, e.g. an enzyme. The viscosity of the liquid and the dissipation of energy caused by hydrodynamic drag effects lead to a reduction in the resonant frequency, and above all in the quality factor.

By way of example, consideration is given to a polycrystalline silicon lever presenting a length L=211 μm, a width w=30 μm, and a thickness t=2.2 μm, encapsulated in 100 nanometers (nm) of silicon nitride. FIG. 1C shows the resonance peaks of this lever in air (curve $R_A$) and in water (curve $R_E$). It can be observed that the resonant frequency goes from a value $f_0^A$=66 kHz in air to a value $f_0^E$=23 kHz in water; at the same time the quality factor Q decreases from a value of 139 to a value of 3. Overall, the factor $f_0.Q/k_{CL}$ on which the sensitivity of the probe depends, decreases by a factor of 133 on going from air to water.

The idea on which the present invention is based consists in abandoning the principle of a cantilever oscillating in bending, and instead using a micromechanical resonator that oscillates in a volume mode. Such a resonator may present a variety of forms, but it is usually constituted by a ring or a disk that is fastened to a support structure via one or more points situated at its outline.

A "volume mode" may be defined as being a mode of vibration characterized by a resonant shape (that is deformed by the resonator oscillating at a resonant frequency) that is symmetrical relative to the plane(s) of its neutral fibers. For example it may be a compression mode as contrasted with a bending mode or a twisting mode that do not present such symmetry.

The use of a volume mode is advantageous in several respects.

Firstly, for a given structure, the spring constant k associated with volume mode is much higher than the constant associated with bending mode. The resonant frequency is thus also higher, and may reach MHz, or even GHz, without it being necessary to reduce the dimensions of the resonator excessively.

The use of a high resonant frequency is advantageous not only from the point of view of probe sensitivity, but also because it makes it possible to obtain good time resolution, thereby making it possible to observe dynamic phenomena in real time. For example, a resonant frequency of several MHz makes it possible to achieve time resolution of the order of one microsecond ($\mu s$); it happens that numerous phenomena of interest in biophysics take place at this time scale.

Furthermore, oscillation of the tip at a high frequency can make it possible to probe objects that are "soft", such as cell membranes, and this is not generally possible with atomic force microscopes known in the prior art. The viscoelastic effect has the result that such objects appear to be stiffer to a tip that is moving at a sufficiently high speed.

Another advantage of using volume modes is that some such modes present node points around the outline of the resonator, i.e. points where there is no movement. The resonator can thus be fastened to a support structure via said node points, thus having the effect of minimizing mechanical energy losses, which are relatively large with the bending of a fixed-end cantilever. This results in an increase in the quality factor Q.

However the greatest advantage that stems from using volume modes of oscillation is the reduction in hydrodynamic losses when used in a liquid medium. When the micromechanical resonator presents a planar structure, it is possible to make use of a planar mode of deformation thereof, i.e. a mode of oscillation in which movement takes place for the most part in the plane of the resonator. In this way, hydrodynamic forces act essentially on an edge face of the resonator, presenting thickness typically of micrometer order.

Micromechanical resonators presenting volume modes of oscillation that can be adapted to making probes for atomic force microscopy are known in the prior art, mainly for use as electromechanical filters in the field of telecommunications. By way of example, mention can be made of the following articles:

J. Wang, Z. Ren, and C. T-C. Nguyen, "1.156-GHz self-aligned vibrating micromechanical disk resonator", IEEE Transactions on Ultrasonics, Ferroelectrics and Frequency Control, Vol. 51, No. 12, pp. 1607-1628, December 2004;

Y. Xie, S. S. Li, Z. Ren, and C. T-C Nguyen, "UHF micromechanical extensional wine-glass mode ring resonators", Technical Digest 2003, 2003 IEEE International Electron Devices Meeting, Washington D.C. (United States), Dec. 8-10, 2003, pp. 953-956; and Z. Hao, S. Pourkamali, and F. Ayazi, "VHF single-crystal silicon elliptic bulk-mode capacitive disk resonators—part I: Design and Modeling", Journal of Microelectromechanical Systems, Vol. 13, No. 6, December 2004, pp. 1043-1053.

FIG. 2 shows a probe for atomic force microscopy in a first embodiment of the invention. The probe SM' is based on a micromechanical resonator RMM in the form of a circular ring presenting an outside diameter $R_{ex}$=40 $\mu m$ and an inside diameter $R_{in}$=30 $\mu m$. The resonator presents a plane deformation mode, said to be of the elliptical type; FIG. 3 shows the ring RMM in its equilibrium state (dashed line), and also in its deformed state corresponding to the maximum amplitude of an oscillation in said volume mode (drawn in continuous lines). For this resonator made of polycrystalline silicon presenting a thickness of 5 $\mu m$, the resonant frequency in elliptical mode is 7.3 MHz and the Q factor in a vacuum is 1000. The oscillations may typically present an amplitude at the antinode point of the order of 30 nm to 50 nm.

FIG. 3 shows that the elliptical mode of oscillation of the ring RMM presents four node points PN1, PN2, PN3, and PN4 that are regularly distributed around the outline C thereof, and also four antinode points PV1, PV2, PV3, and PV4 that are likewise regularly distributed around the outline C and that are offset at 45° from said node points.

The node points, where movements are zero, are used for fastening the resonator RMM to a support structure STS in the form of a lever by means of four beams LF1, LF2, LF3, and LF4. Fastening at node points serves to limit mechanical energy losses.

Two tips P1 and P2 are disposed in correspondence with two diametrically opposite antinode points PV1 and PV2. One of the tips P1 is for probing the surface to be imaged SI, while the other serves to make the structure symmetrical with respect to the vibration mode used. When the elliptical mode is excited, the tip P1 performs reciprocating motion in a radial direction, thereby causing it to move towards and away from the surface SI. Under such conditions, the forces of interaction between the tip and the surface modify the resonant frequency and the quality factor of the resonator. This makes it possible firstly to characterize the surface in the same manner as with AFM probes known in the prior art, or secondly by measuring the additional dissipation of the resonator induced by the interaction between the tip and the surface.

To excite the elliptical mode, it is necessary to apply a radially-directed force to a point on the outline C of the resonator RMM, and preferably to an antinode point. In the embodiment of FIG. 2, means for selectively exciting the elliptical mode of oscillation are provided in the form of a circularly arcuate electrode EL1 having width lying typically in the range 1 $\mu m$ to 200 $\mu m$ and situated outside the ring RMM, facing the antinode point PV3, and spaced away from the outline C of said ring by a gap ES1. When an alternating electrical signal at a frequency that corresponds to the resonant frequency of the elliptical mode is applied to the electrode EL1, said elliptical mode is excited selectively by the electrostatic effect. The use of an electrostatic type of actuation in a micromechanical system is known, see for example the article by H. Camon, J. Y Fourniols, S. Muratet, and B. Estibals, "Microsystèmes à actionnement électrostatique: conception, modélisation et caractérisation" [Electrostatically-actuated microsystems: design, modeling, and characterization], J3eA, Journal sur l'enseignement des sciences et technologies de l'information et des systemes, Vol. 2, Hors-Série 2, 2 (2003), accessible on the Internet at the address: http://www.bibsciences.org/bibsup/j3ea/full_HS/vol2_HS2/2/pdf/J3EAvol2_HS2_2.pdf Oscillation can be detected in capacitive manner by using a second electrode EL2 disposed symmetrically relative to the excitation electrode EL1. When a constant potential difference is applied between the electrode EL2 and the resonator RMM, the oscillations of the resonator cause the gap ES2 to vary in width, thereby varying the capacitance of the system, and thus giving rise to an alternating electrical signal.

It is of interest to observe that the probe SM' of the invention can be made entirely in one-piece or "monolithic" form, including the means for exciting and detecting oscillations, and that this can be done merely by using conventional lithographic techniques. This constitutes another advantage of the invention compared with the prior art.

Numerous variant embodiments are possible.

The micromechanical resonator RMM may be in the form of a ring, having an outside radius $R_{ex}$ lying in the range 0.1 µm to 200 µm and a width that depends both on the need to obtain sufficient mechanical strength and on technological limits specific to fabrication methods using lithography (at present of the order of 8 nm). The resonator may also be in the form of a disk; this generally gives rise to a resonant frequency that is higher than when using an annular resonator. It is not essential for its shape to be circular, since it is possible for example to envisage using resonators that are in the form of a plate that is polygonal, possibly with rounded corners; Similarly, the elliptical mode is merely one possible mode that can be selected from amongst others. The above-mentioned articles provide examples of resonators that can be used for implementing the invention.

The thickness of the resonator RMM may lie in the range 0.01 µm to 10 µm, and preferably in the range 0.05 µm to 5 µm. A small thickness is preferred for resonators that are to be used in a liquid medium.

In a vacuum, the resonant frequency of the volume mode used may lie in the range 10 MHz to 20 GHz, and preferably lies in the range 50 MHz to 2 GHz, with a Q factor lying in the range $10^3$ to $10^5$ (and preferably in the range $5 \times 10^3$ to $5 \times 10^4$). In water, the resonant frequency may preferably lie in the range 5 MHz to 500 MHz, with a Q factor lying in the range $10^2$ to $5 \times 10^4$ (preferably in the range $10^3$ to $10^4$).

The use of an electrostatic technique for exciting and detecting vibration of the resonator RMM is particularly advantageous, however other methods may be preferred in special circumstances, for example using piezoelectric layers.

In the example of FIG. 2, the resonator presents fastener means LF1-LF4 matching each of the node points. To minimize energy losses, it is possible to envisage using fewer fastener means: in the limit, a single fastener point may suffice.

The resonator is not necessarily fastened to the support structure via its outline: the above-mentioned article by J. Wang et al., for example, shows an example of a resonator that is supported by its center.

The use of two diametrically opposite tips P1 and P2 is not essential: its purpose is merely to preserve the symmetry of the structure in terms of its moment of inertia, and thus to make it easier to determine its node and antinode points. In a variant, it is possible to use means for balancing the structure, or a balance weight, that is not in the form of a tip. It is also possible to use a plurality of tips or balance weights distributed uniformly around the outline C of the resonator. It is also possible to provide a single tip P1 and no balance weight, thus making do with a resonator that does not have a symmetrical structure.

Finally, it is not essential for the tip(s) to lie in the plane of the resonator, projecting from the outline thereof. FIG. 4 shows an example of a probe SM" in which the tips P1' and P2' extend perpendicularly to the plane of the resonator; the resonator is slightly inclined so that only the tip P1' can interact with the surface SI. It should be observed that, under such circumstances, the movement of the tip P'1 is practically parallel to the surface SI: the probe thus operates in a manner that is different from the example of FIG. 2. This can be referred to as shear mode and is described in the article by K. Karrai et al., "Piezoelectric tip-sample distance control for near field optical microscopes", Applied Physics Letters, Apr. 3, 1995, Vol. 66, No 14, pp. 1842-1844.

The invention claimed is:

1. A probe for atomic force microscopy comprising a micromechanical resonator and a tip for atomic force microscopy projecting from said resonator:
   wherein said probe also includes means for selectively exciting a volume mode of oscillation of said resonator; and
   said tip for atomic force microscopy projects from said resonator substantially in correspondence with an antinode point of said volume mode of oscillation.

2. The probe for atomic force microscopy according to claim 1, also including means for detecting the oscillations of said micromechanical resonator in said volume mode of oscillation.

3. The probe for atomic force microscopy according to claim 2, wherein said means for detecting the oscillations of said micromechanical resonator are selected from a capacitive sensor and a piezoelectric sensor.

4. The probe for atomic force microscopy according to claim 1, wherein said means for selectively exciting a volume mode of oscillation of said resonator are selected from a capacitive actuator and a piezoelectric actuator.

5. The probe for atomic force microscopy according to claim 1, wherein said micromechanical resonator presents a planar structure, and wherein said volume mode of oscillation is a planar mode of deformation of said resonator.

6. The probe for atomic force microscopy according to claim 5, wherein said micromechanical resonator presents thickness lying in the range 0.01 µm to 10 µm.

7. The probe for atomic force microscopy according to claim 5, wherein said micromechanical resonator is in the form of a disk or a ring.

8. The probe for atomic force microscopy according to claim 7, wherein said volume mode of oscillation is an elliptical mode.

9. The probe for atomic force microscopy according to claim 7, wherein micromechanical resonator in the form of a disk or a ring presents an outside radius lying in the range 0.1 µm to 200 µm.

10. The probe for atomic force microscopy according to claim 5, wherein said tip for atomic force microscopy extends in the plane of said micromechanical resonator from the outline thereof.

11. The probe for atomic force microscopy according to claim 5, wherein said tip for atomic force microscopy forms an angle with the plane of said micromechanical resonator.

12. The probe for atomic force microscopy according to claim 1, wherein said volume mode of oscillation presents a resonant frequency in a vacuum lying in the range 10 MHz to 20 GHz.

13. The probe for atomic force microscopy according to claim 1, wherein said micromechanical resonator presents, for said volume mode of oscillation, a quality factor in a vacuum lying in the range $10^3$ to $10^5$.

14. The probe for atomic force microscopy according to claim 1, wherein said micromechanical resonator presents, for said volume mode of oscillation, a quality factor in water lying in the range $10^2$ to $5\times10^4$.

15. The probe for atomic force microscopy according to claim 1, wherein said volume mode of oscillation presents at least one node point on the outline of said micromechanical resonator, and wherein the resonator presents fastener means for fastening it to a support structure positioned in correspondence with said node point.

16. The probe for atomic force microscopy according to claim 15, including single fastener means fastening it to the support structure, said fastener means being in the form of a beam.

17. The probe for atomic force microscopy according to claim 1, wherein said micromechanical resonator presents a structure that is symmetrical, said probe presenting at least one balancing element having a moment of inertia substantially equal to that of the tip and disposed in such a manner as to preserve the symmetry of said structure.

18. The probe for atomic force microscopy according to claim 1, wherein at least said micromechanical resonator and said tip for atomic force microscopy are made monolithically.

19. The probe for atomic force microscopy according to claim 18, wherein said micromechanical resonator, said tip for atomic force microscopy, said electrostatic sensor, and said electrostatic actuator are made monolithically.

20. The probe for atomic force microscopy according to claim 1, wherein at least said micromechanical resonator and said tip for atomic force microscopy are made of silicon.

21. The probe for atomic force microscopy according to claim 1, wherein said micromechanical resonator is disposed at the end of a beam constituting a support structure therefor.

22. An atomic force microscope including a probe according to claim 1.

23. A method of atomic force microscopy comprising:
causing the tip for atomic force microscopy of a probe according to claim 1 to approach a surface for imaging;
selectively exciting a volume mode of oscillation of the micromechanical resonator of said probe by using means provided for that purpose, said volume mode of oscillation presenting a resonant frequency; and
detecting variations in the resonant frequency of said volume mode of oscillation as induced by forces acting between said surface for imaging and said tip for atomic force microscopy.

24. A method of atomic force microscopy comprising:
causing the tip for atomic force microscopy of a probe according to claim 1 to approach a surface for imaging;
selectively exciting a volume mode of oscillation of the micromechanical resonator of said probe by using means provided for that purpose, said volume mode of oscillation presenting a resonant frequency; and
detecting the variations in the amplitude of said volume mode of oscillation as induced by forces acting between said surface for imaging and said tip for atomic force microscopy.

25. The method according to claim 23, wherein at least said surface for imaging and said tip for atomic force microscopy are immersed in a liquid medium.

26. The method according to claim 24, wherein at least said surface for imaging and said tip for atomic force microscopy are immersed in a liquid medium.

* * * * *